United States Patent [19]

Rigler et al.

[11] Patent Number: 4,575,945
[45] Date of Patent: Mar. 18, 1986

[54] MEASURING ARRANGEMENT, AND A METHOD, FOR MEASURING THE GAP FORMED BETWEEN A FIRST AND A SECOND ROLL OR ROLLER

[75] Inventors: Günter Rigler, Linz, Austria; Friedrich Vollmer, Hagen, Fed. Rep. of Germany

[73] Assignees: Voest-Alpine Aktiengesellschaft, Linz, Austria; Friedrich Vollmer Fienmessgeratebau GmbH, Fed. Rep. of Germany

[21] Appl. No.: 717,717

[22] Filed: Mar. 29, 1985

[30] Foreign Application Priority Data

Apr. 6, 1984 [AT] Austria ................................ 1183/84

[51] Int. Cl.⁴ .............................................. G01B 7/14
[52] U.S. Cl. .................................... 33/182; 33/143 L
[58] Field of Search ............... 33/182, 147 K, 147 L, 33/520, 542, 143 L

[56] References Cited

U.S. PATENT DOCUMENTS

| | | | |
|---|---|---|---|
| 3,646,686 | 3/1972 | Kreiskorte | 33/182 |
| 3,718,019 | 2/1973 | Box et al. | 33/182 |
| 3,940,855 | 3/1976 | Ver Nooy et al. | 33/178 F |
| 4,132,003 | 1/1979 | Schrewe et al. | 33/182 |
| 4,148,145 | 4/1979 | Holter et al. | 33/182 |
| 4,471,531 | 9/1984 | Gunderson | 33/182 |

FOREIGN PATENT DOCUMENTS 160606 12/1981 Japan ........................................ 33/182

*Primary Examiner*—Willis Little
*Attorney, Agent, or Firm*—Brumbaugh, Graves, Donohue & Raymond

[57] ABSTRACT

An arrangement for measuring the gap between two rolls or rollers includes a measuring body on which at least three support rollers that get into contact with a surface of one of the rolls or rollers are provided on one side to adjust the measuring body between the rolls or rollers. Two of the support rollers are located on either side of the gap to be measured, symmetrical with respect to the gap plane. At least two support rollers that get into contact with the surface of the second roll or roller, contacting the surface of the second roll or roller in contact points located symmetrical to the gap plane, are provided on the opposite side of the measuring body. At least two support rollers for the one roll or roller, that are arranged symmetrical to the gap plane, are synchronously movable towards the surface of the roll or roller and are pressable at the same. The measuring body is provided with two diametrically opposite measuring tracers, whose measuring heads are movable in a symmetrical plane between the support rollers that get into contact with the surfaces of the rolls or rollers on either side of the gap plane, i.e., are movable in the gap plane towards the surfaces of the rolls or rollers.

9 Claims, 3 Drawing Figures

4,575,945

MEASURING ARRANGEMENT, AND A METHOD, FOR MEASURING THE GAP FORMED BETWEEN A FIRST AND A SECOND ROLL OR ROLLER

BACKGROUND OF THE INVENTION

The invention relates to an arrangement for measuring the gap between two rolls or rollers, comprising a measuring body on which at least three support rollers that get into contact with a surface of one of the rolls or rollers are provided on one side to adjust the measuring body between the rolls or rollers, two of which support rollers are located on either side of the gap to be measured, being symmetrical with respect to the gap plane, and at least two support rollers that get into contact with the surface of the second roll or roller at contact points located symmetrical to the gap plane, are provided on the opposite side of the measuring body. At least two support rollers for the one roll or roller, that are arranged symmetrical to the gap plane, are synchronously movable towards the surface of the roll or roller and are pressable at the same. The measuring body is provided with two diametrically opposite measuring tracers, whose measuring heads are movable in a symmetrical plane between the support rollers that get into contact with the surfaces of the rolls or rollers on either side of the gap plane, i.e., are movable in the gap plane towards the surfaces of the rolls or rollers. The invention also relates to a method for carrying out the measurement.

In a know measuring arrangement (German Offenlegungsschrift No. 1,752,947), the axes of the support rollers are arranged parallel to the axes of the rolls forming the gap to be measured. The rollers retainers and are pressable at the surfaces of the rolls to be measured. The distance between the roller retainers arranged on either side of the gap plane distorting to determine the gap width between the rolls, which distance is applied to calculate the width of the gap to be measured provided the roll diameter is known.

With this known measuring arrangement it is, thus, not the gap proper that is measured, but the distance between the roller retainers. A disadvantage of this method is that the measured result must be calculated by taking into account the geometric features of the measuring arrangement and of the rolls, with allowances being made for the parts of the measuring device and of the rolls. With large roll diameters, a strong wedge action occurs at the roller retainers, the measured result thus being influenced by the force adjusting the roller retainers to the roll surfaces.

A further disadvantage of this known device is that roll generatrices lying outside of the gap plane are measured, whereby deviations of the roll shapes from the ideal geometric shape enter into the measured result, distorting the latter.

A measuring arrangement of the initially defined kind is known from German Auslegeschrift No. 2,639,240. With this measuring arrangement, the gap between two rolls or rollers is measured precisely in the gap plane, i.e., in the plane through the axes of the oppositely arranged rolls or rollers; yet, the support rollers are motionally coupled with the measuring heads, the measured result thus being influenced by the pressure forces of the support rollers exerted on the rolls or forming the gap to be measured.

A further so not have the necessary accuracy. measuring arrangement is in that the measuring procedure is feasible always at one single point only of the longitudinal extension of the roll or roller to be measured. In order to be able to exactly measure the gap over its total length, the known measuring arrangement must be removed from the gap, be displaced in the axial direction of the roll or roller and be reinserted into the gap. This is cumbersome and time-consuming and, if the rolls or rollers of two consecutive measurements are not precisely fixed in their positions, this may lead to inexact results, particularly if the rolls or rollers have a cross section deviating from the circular shape.

Furthermore, it is known with cold or hot rolling stands for rolling metals, to detect changes of the rolling gap which occur due to mechanical wear, regrinding, thermal influences on the surfaces of the rolls and dead weight forces of the rolls, by means of complex mathematical models, and to carry out the appropriate correctional measures without performing any measurements. This suffers the disadvantage that the actual shape of the rolling gap is not seized at all. For an effective correction, the calculated values do not have the necessary accuracy.

The invention aims at avoiding these disadvantages and difficulties and has as its object to provide an arrangement of the initially described kind as well as a method for exactly measuring the gap and determining the surface shape of the rolls or rollers in the gap plane, with sources of errors that distort the measured result being avoided. In particular, the gap is to be simply measured over its total length and the measured result is to remain unaffected by the forces pressing the support rollers at the surfaces of the rolls or rollers.

SUMMARY OF THE INVENTION

This object is achieved according to the invention in that the axles of the support rollers are directed perpendicular to the axes of the rolls or rollers and are pivotably mounted on the measuring body.

If the device were to automatically measure the gap to be measured over its total length, in particular with broad strip roll trains, at least two support rollers advantageously are drivable.

A synchronous movement of the support rollers suitably is ensured in that the axles of the support rollers are pivoted in the measuring body by means of a toothed gearing.

A preferred embodiment, which stands out for its special stability and is particularly suited for broad strip roll trains is characterized in that eight support rollers are provided on the measuring body, four of which each serve to abut on a surface of a roll or roller. Two axles each of the support rollers, that are arranged diametrically opposite the axis of the measuring body, are rigidly connected and are mounted to be pivotable about an axis of the measuring body that is parallel to the axes of the rolls or rollers.

In order to obtain exact measurements immediately upon hot rolling in a rolling mill, the arrangement preferably is provided with a temperature probe, the temperature probe suitably being arranged in the vicinity of one of the measuring tracers.

A method for measuring the gap between two rolls or rollers is characterized in that the measuring arrangement, after being inserted into the gap and centered by means of the support rollers, is moved along the gap in the longitudinal direction of the rolls or rollers, the gap being continuously measured, and wherein, suitably, simultaneously with the measuring of the gap, the surface temperature of the rolls or rollers is measured.

If irregularities of the roll surface occur over its circumference, these advantageously can be detected in that the gap is remeasured after further turning the rolls or rollers a predetermined angle.

BRIEF DESCRIPTION OF THE DRAWINGS

The invention will now be explained in more detail by way of one embodiment and with reference to the accompanying drawings, wherein.

DETAILED DESCRITION OF THE PREFERRED EMBODIMENT

Figure 1:
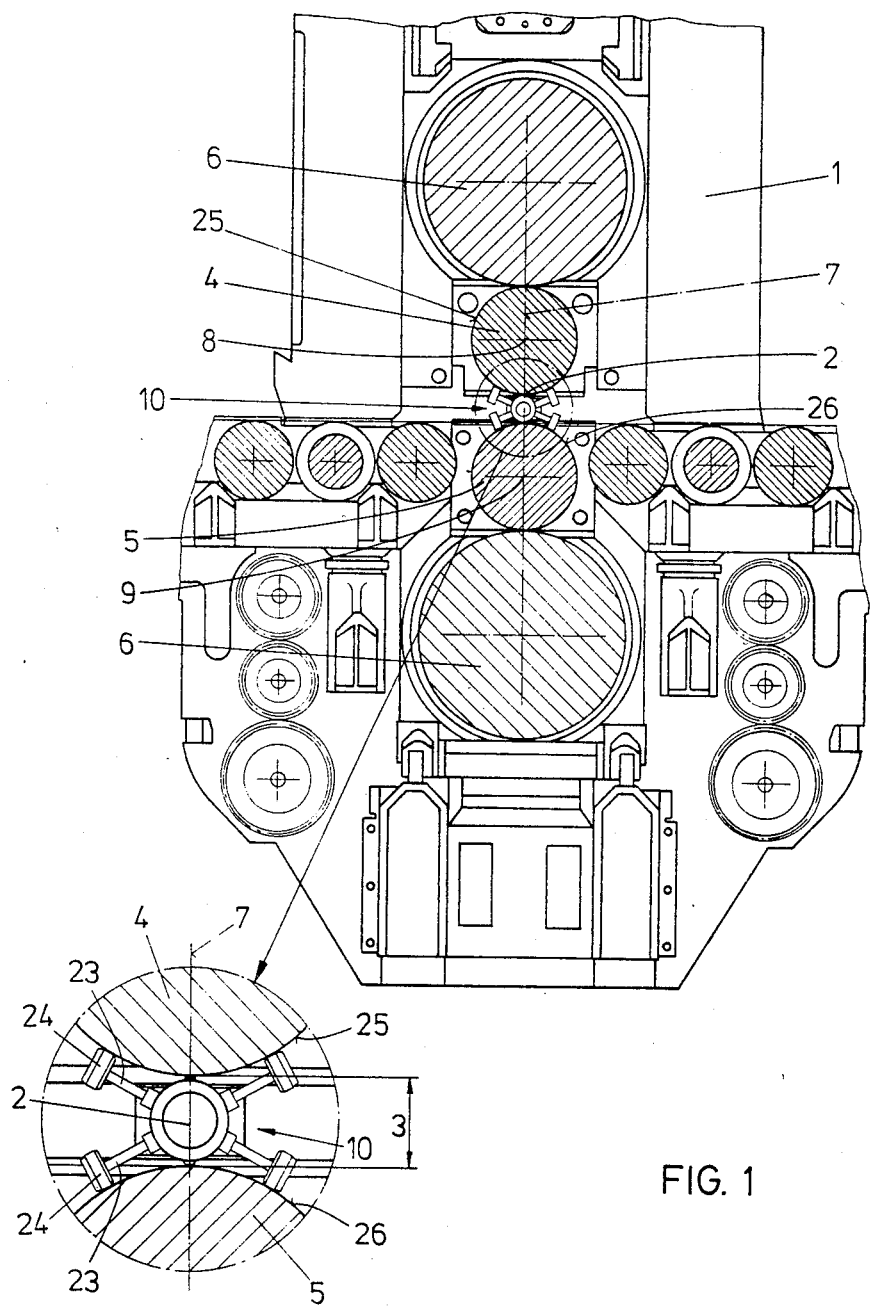
FIG. 1 is a schematic side view of a rolling mill stand of a hot broad strip train.
Figure 2:
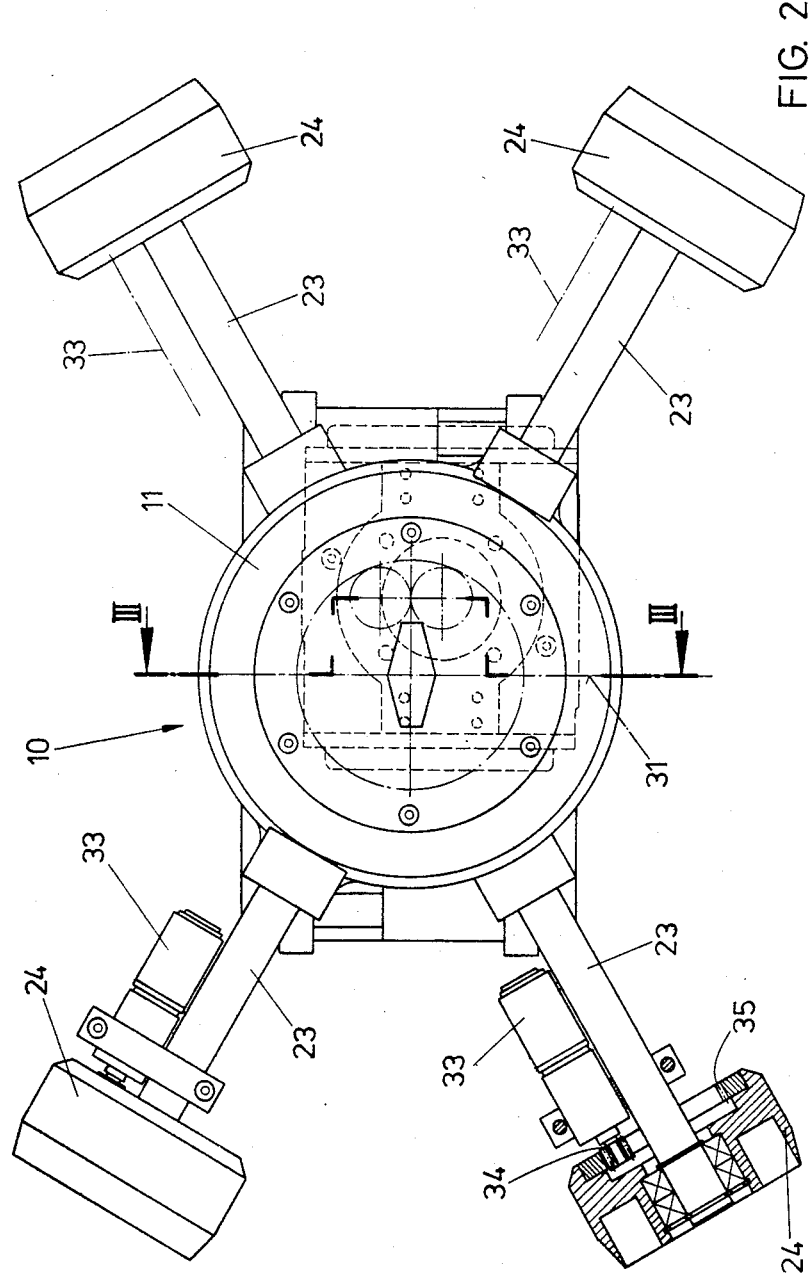
FIG. 2 is a front view of the measuring arrangement.
Figure 3:
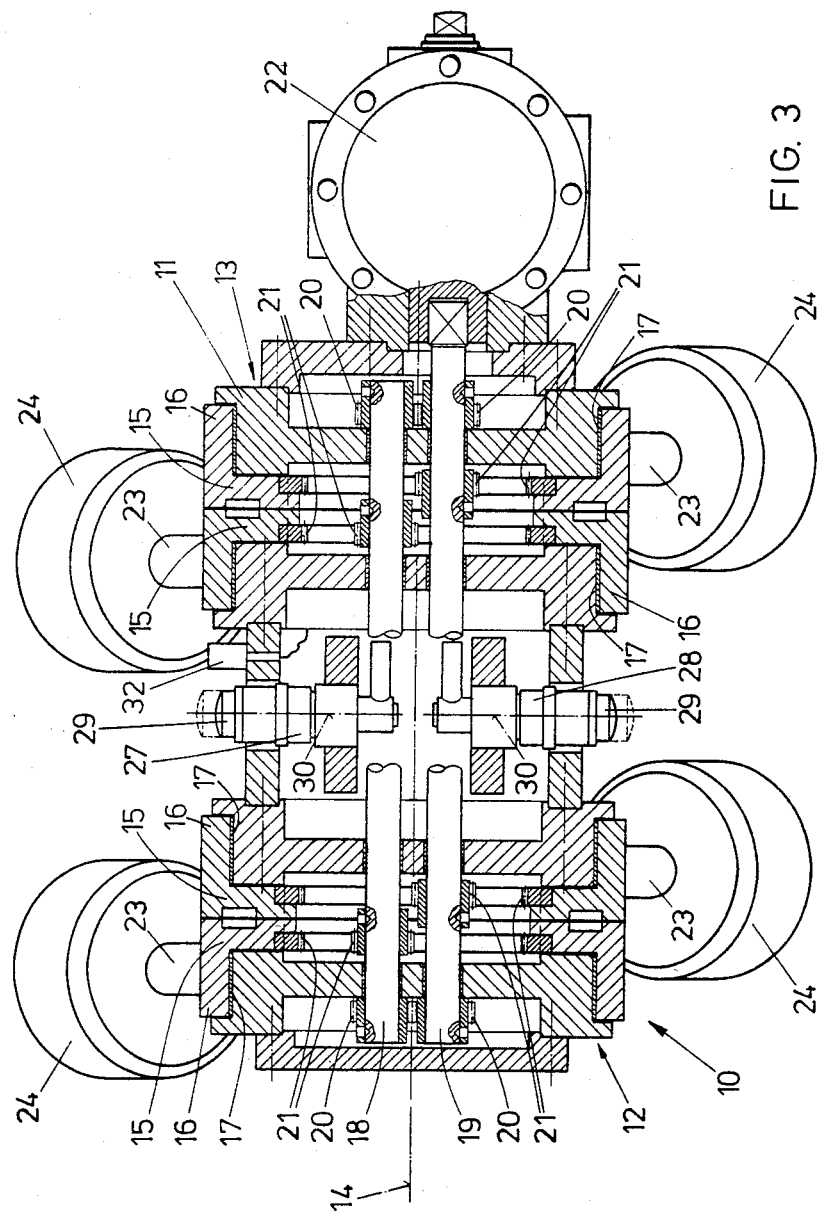
FIG. 3 is a section along line III—III of FIG. 2.

The rolling stand illustrated in FIG. 1 is a hot-rolling stand of a broad strip train, in which an upper roll 4 and a lower roll 5, movably journaled in a roll housing 1 to adjust a gap 2 having a predetermined width 3, are each supported by a support roll 6. The gap 2 to be measured constitutes a gap plane 7 extending through the axes 8, 9 of the upper and lower rolls 4, 5.

The measuring arrangement 10 comprises a hollow measuring body 11 forming a casing. Both on the front and on the rear ends 12, 13 of the measuring body 11, two carrying rings 15 are each provided, which are journaled pivotably about the longitudinal axis 14 of the measuring body and whose mounting on the measuring body 11 is effected by the flanges 16 of the carrying rings 15, which are directed in the direction of the longitudinal axis 14 of the measuring body 11 and which abut on the measuring body 11 by means of slide bearings 17. Two carrying rings 15 provided on one end 12, 13 of the measuring body are each coupled in their rotational movement in a manner that a rotation of the carrying ring 15 in one direction about a certain angle involves a rotation of the neighboring carrying ring 15 in the opposite rotational direction by exactly the same angle. This is effected by two shafts 18, 19 rotatably mounted in the measuring body in the direction of the longitudinal axis 14 of the measuring body and meshing via toothed wheels 20, one of the neighboring carrying rings 15, each being motionally coupled with one shaft 18 via toothed wheels 21 and the neighboring carrying ring 15 being motionally coupled with the second shaft 19 also via toothed wheels 21.

On account of the coupling of one carrying ring on one end 12 with a second carrying ring on the other end 13 of the measuring body 11, the rotation of a carrying ring 15 not only causes the opposite rotation of the neighboring carrying ring 15, but also causes the rotation of the corresponding carrying ring 15 on the other end 13 of the measuring body 11 as well as the opposite rotation of the carrying ring 15 neighboring the same. One of the shafts is coupled to a rotation drive 22 provided on one front side of the measuring body 11.

To each carrying ring, two aligning axles 23 directed approximately perpendicular to the ring, axis 14 of the measuring body 11 are fastened, on whose free ends support rollers 24 are rotatably journaled, which function as centering supports for the measuring body 11. Thus, the measuring body 11 is provided with eight support rollers, which serve to guide and center the measuring body 11 in the rolling gap 2. Four support rollers 24 each abut on one of the roll surfaces 25, 26 of the rolls 4, 5. By the rotation drive 22, the carrying rings 15 and thus the support rollers 24 are moved via the shafts 18, 19 in a manner whereby the support rollers 24 are pressed at the surfaces 25, 26 of the two oppositely arranged rolls 4, 5. Thereby, the measuring body is automatically adjusted in the rolling gap 2 such that its longitudinal axis 14 is directed parallel to the axes 8, 9 of the rolls 4, 5, lying in the gap plane 7 laid through these axes 8, 9.

Approximately in the middle of the longitudinal extension of the measuring body 11 and between the end-side carrying ring pairs, measuring tracers 27, 28 are provided on opposite sides of the measuring body 11, whose measuring heads 29 are movable in the direction of the axes 30 of the measuring tracers 27, 28 and are pressed outwardly, preferably by means of springs. The measuring tracers 27, 28 are arranged on the measuring body 11 in a manner that their aligning axes 30 are located in the symmetrical plane 31 of the oppositely movable support rollers 24 laid through the longitudinal axis 14 of the measuring body 11. Closely beside one of the measuring tracers 27, a temperature probe 32 is provided.

The values recorded by the measuring tracers 27, 28 and by the temperature probe 32 are transmitted to an evaluating device either via a trailing cable (not illustrated) or by radiotelegraphy.

The arrangement functions in the following manner:

In certain time intervals, the gap 2 between the upper and lower rolls 4, 5 and the shape of the surfaces 25, 26 of the rolls 4, 5 are measured by introducing the measuring arrangement 10 into the gap 2, which, to this end, either is slightly opened or, if large enough, remains unchanged. The measuring arrangement can be inserted between the rolls from the front side, the roll housing 1, for this purpose, being provided with a passage in which the measuring arrangement may be deposited if not in use. Furthermore, it is possible to introduce the measuring arrangement in the rolling direction, the axles 23 of the support rollers 24 being pivoted towards each other until the measuring arrangement is insertable into the rolling gap 2.

Because of the rotation drive 22, which moves the axles 23 and, thus, the support rollers 24 towards each other and towards the surfaces 25, 26 of the rolls 4, 5, the measuring body 11 is exactly adjusted in the rolling gap 2 such that the axes 30 of the two measuring tracers come to lie in the gap plane 7. By driving two support rollers 24 by means of motors 33 engaging a pinion 34 in an internal toothing 35 of a support roller, the measuring body 11 is displaced along the gap 2 while measuring the rolling gap by means of the measuring tracers 27, 28 and, if desired, while measuring the temperature of the roll surface 25 or 26 by means of the temperature probe 32, the measuring body 11 being guided in the direction of the gap 2 by means of the support rollers 24.

By means of the measuring tracer, the exact actual profile of the roll surfaces 25, 26 can be traced at the generatrices thereof that lie next to each other. The measurement is effected directly, i.e., without intermediate members distorting the measured result. Because the measuring body 11 is guided by means of the support rollers 24, local errors of the gap 2 or of a roll surface 25, 26 are recorded only by the measuring tracer 27 or 28 that belongs to this roll surface 25, 26. Due to the fact that two of the support rollers 24 that abut on the lower roll 5 are driven, the arrangement is characterized by a very precise straight run, both when moving forward and when moving backward. The low mass of the measuring body 11 and its low center of gravity are further advantages favoring the straight run. Due to the movement of the support rollers 24 independent of the movement of the measuring heads 29, the measured result is unaffected by the pressure forces of the support rollers so that very high pressure forces may be chosen very high for the exact adjustment of the measuring body 11.

If the measurement is repeated after an angular rotation of the two rolls 4, 5 by a predetermined angle, it is possible to locate local grinding errors. The measurement of the surface temperature of the rolls simultaneously with the measurement of the gap permits a temperature correction of the roll or gap profiles measured.

The invention is not limited to the embodiment illustrate in the drawings, but may be modified in various aspects. To guide the measuring body 11, eight support rollers 24, i.e., four on each roll surface, are not necessarily required, but three on one roll surface 26 and two on the opposite roll surface 25 will do. Thereby, the measuring body 11 is supported on the lower roll 5 similar to a tripod.

The measuring arrangement need not be equipped with a moving drive, but it can also be pulled or pushed between the rolls 4 and 5 by means of a rope or a rod. Furthermore, it is not necessary to provide temperature probes 32 in the immediate vicinity of a measuring tracer 27, 28; they could also be provided next to a support roller 24.

What we claim is:

1. In a measuring arrangement for measuring the gap formed between a first and a second roll or roller and of the type including a measuring body, at least three support rollers provided on said measuring body on one side thereof for adjusting said measuring body between said first and second rolls or rollers and getting into contact with a surface of one of said first and second rolls or rollers, two of said support rollers being arranged on either side of said gap to be measured, symmetrical with respect to the gap plane, at least two support rollers being provided on the opposite side of said measuring body to get into contact with the surface of the second roll or roller, contacting the surface of said second roll or roller in contact points located symmetrical to the gap plane, wherein at least two support rollers arranged symmetrical to the gap plane and provided for one of said first and second rolls or rollers are synchronously movable towards the surface of said one of said first and second rolls or rollers and are pressable thereat, two diametrically oppositely arranged measuring tracers being provided on said measuring body and including measuring heads movable towards the surfaces of said rolls or rollers in a symmetrical plane between said support rollers getting into contact with the surfaces of said rolls or rollers on either side of said gap plane, i.e., in the gap plane, the improvement wherein said support rollers have support roller axles that are directed perpendicular to the axes of said rolls or rollers and are pivotably mounted on said measuring body.

2. A measuring arrangement as set forth in claim 1, wherein at least two of said support rollers are drivable.

3. A measuring arrangement as set forth in claim 1, further comprising gear wheel drives provided in said measuring body for synchronously pivoting said support roller axles.

4. A measuring arrangement as set forth in claim 1, wherein said measuring body has a measuring body axis extending parallel to the axes of said rolls or rollers, and eight support rollers are provided on said measuring body, four of said eight support rollers each serving to abut on a surface of one of said rolls or rollers, two of said support roller axles each that are arranged diametrically opposite said measuring body axis being rigidly connected and mounted so as to be pivotable about said measuring body axis.

5. A measuring arrangement as set forth in claim 1, further comprising a temperature probe.

6. A measuring arrangement as set forth in claim 5, wherein said temperature probe is arranged so as to neighbor one of said measuring tracers.

7. A method for measuring the gap formed between a first and a second roll or roller by a measuring arrangement comprising a measuring body, at least three support rollers provided on said measuring body on one side thereof for adjusting said measuring body between said first and second rolls or rollers and getting into contact with a surface of one of said first and second rolls or rollers, two of said support rollers being arranged on either side of said gap to be measured, symmetrical with respect to the gap plane, at least two support rollers being provided on the opposite side of said measuring body to get into contact with the surface of the second roll or roller, contacting the surface of said second roll or roller in contact points located symmetrical to the gap plane, and at least two support rollers arranged symmetrical to the gap plane and provided for one of said first and second rolls or rollers being synchronously movable towards the surface of said one of said first and second rolls or rollers and pressable thereat, two diametrically oppositely arranged measuring tracers provided on said measuring body and including measuring heads movable towards the surfaces of said rolls or rollers in a symmetrical plane between said support rollers getting into contact with the surfaces of said rolls or rollers on either side of said gap plane, i.e., in the gap plane, and support roller axles provided for said support rollers, said support roller axles being directed perpendicular to the axes of said rolls or rollers and are pivotably mounted on said measuring body, which method comprises the steps of
introducing said measuring arrangement into said gap,
centering said measuring arrangement by said support rollers, and
moving said measuring arrangement in the longitudinal direction of said rolls or rollers along said gap while continuously measuring said gap.

8. A method as set forth in claim 7, wherein said measuring arrangement further comprises, a temperature probe and the temperature of the surface of said rolls or rollers is measured simultaneously with said measuring of said gap.

9. A method as set forth in claims 7 or 8, wherein said measuring of said gap is repeated after turning of the rolls or rollers by a predetermined angle.

* * * * *

UNITED STATES PATENT AND TRADEMARK OFFICE
CERTIFICATE OF CORRECTION

PATENT NO. : 4,575,945

DATED : Mar. 18, 1986

INVENTOR(S) : Rigler et al.

It is certified that error appears in the above-identified patent and that said Letters Patent is hereby corrected as shown below:

On the title page, following the last line of Item 57 (ABSTRACT), insert --In order to be able to exactly measure the gap over its total length in a simple way and to keep the measured result unaffected by the forces pressing the support rollers at the surfaces of the rolls or rollers, the axles of the support rollers are directed perpendicular to the axes of the rolls or rollers and are pivotably mounted on the measuring body.--. Col. 1, line 31, "know" should read --known--; line 34 after "rollers" insert --are arranged in roller--; line 37, "distorting" should read --serves--; line 67, change "so not have the necessary accuracy" to --disadvantage of the known--; line 68, delete "in". Col. 3, line 18, "DESCRITION" should read --DESCRIPTION--; line 63, "ring," should read --longitudinal--. Col. 5, line 10, delete "very high".

Signed and Sealed this

Twenty-sixth Day of August 1986

[SEAL]

Attest:

DONALD J. QUIGG

Attesting Officer

Commissioner of Patents and Trademarks